United States Patent
Baechtiger

(10) Patent No.: US 7,577,576 B2
(45) Date of Patent: Aug. 18, 2009

(54) NETWORK BRANCH PLACEMENT TOOL

(76) Inventor: Walter Baechtiger, 414 Fourth St., San Rafael, CA (US) 94901

( * ) Notice: Subject to any disclaimer, the term of this patent is extended or adjusted under 35 U.S.C. 154(b) by 1081 days.

(21) Appl. No.: 10/699,107

(22) Filed: Oct. 31, 2003

(65) Prior Publication Data

US 2005/0096971 A1    May 5, 2005

(51) Int. Cl.
*G06Q 10/00* (2006.01)
(52) U.S. Cl. .......................................................... 705/7
(58) Field of Classification Search ...................... 705/7
See application file for complete search history.

(56) References Cited

U.S. PATENT DOCUMENTS

| | | | |
|---|---|---|---|
| 4,935,877 A | | 6/1990 | Koza |
| 5,319,781 A | | 6/1994 | Syswerda |
| 5,343,388 A | * | 8/1994 | Wedelin ........................ 705/8 |
| 5,504,887 A | * | 4/1996 | Malhotra et al. ............ 707/205 |
| 5,541,848 A | | 7/1996 | McCormack et al. |
| 5,546,542 A | * | 8/1996 | Cosares et al. .............. 709/241 |
| 5,848,403 A | | 12/1998 | Gabriner et al. |
| 5,897,629 A | | 4/1999 | Shinagawa et al. |
| 5,940,816 A | * | 8/1999 | Fuhrer et al. .................. 706/13 |
| 6,092,065 A | * | 7/2000 | Floratos et al. ................ 707/6 |
| 6,282,527 B1 | | 8/2001 | Gounares et al. |
| 6,363,368 B2 | | 3/2002 | Shinagawa |
| 6,470,301 B1 | | 10/2002 | Barral |
| 6,526,373 B1 | | 2/2003 | Barral |
| 6,578,005 B1 | | 6/2003 | Lesaint |
| 2002/0188489 A1 | * | 12/2002 | Cheng et al. .................... 705/8 |
| 2003/0099014 A1 | * | 5/2003 | Egner et al. ................. 359/124 |

OTHER PUBLICATIONS

Shmoys, et. Al, "Approximation algorithms for facility location problems", 1997, Proceedings of the twenty-ninth annual ACM symposium on Theory of computing, El Paso, Texas, United States,pp. 265-274(1-21).*
Mahdian, et al, "A Greedy Facility Location Algorithm Analyzed Using Dual Fitting", Lecture Notes In Computer Science; vol. 2129, 2001, Proceedings of the 4th International Workshop on Approximation Algorithms for Combinatorial Optimization Problems, ISBN:3-540-42470-9.*
AB Hadj-Alouane, JC Bean; "A Genetic Algorithm for the Multiple-Choice Integer Program"- Operations Research, 1997—JSTOR.*

* cited by examiner

*Primary Examiner*—Jonathan G Sterrett

(57) ABSTRACT

A method for placing branch locations having the steps of: (a) identifying at least one service provider branch location, (b) identifying at least one service receiver, (c) identifying a measure of service receiver value, (d) calculating the value of each of the service receivers based on the measure of service receiver value, (e) determining which of the service provider branch locations is the closest service provider branch location for each of the service receivers, and (f) determining a probability that each of the service receivers will utilize the closest service provider branch location.

2 Claims, 6 Drawing Sheets

| Solution1 | Solution2 | Solution3 | Solution4 | Solution5 | Solution6 |
|---|---|---|---|---|---|
| TO OPEN | TO OPEN | TO OPEN | TO OPEN | TO OPEN | TO OPEN |
| ZIP 93872 | ZIP 93225 | ZIP 94078 | ZIP 93312 | ZIP 92631 | |
| ZIP 94801 | ZIP 93028 | ZIP 93764 | ZIP 94397 | ZIP 94956 | |
| ZIP 92845 | ZIP 93391 | ZIP 93160 | ZIP 94393 | ZIP 92433 | |
| ZIP 94822 | ZIP 93996 | ZIP 92514 | ZIP 92331 | ZIP 92007 | |
| ZIP 93876 | ZIP 92867 | ZIP 94374 | ZIP 94978 | ZIP 92487 | |
| ZIP 94064 | ZIP 92287 | ZIP 94609 | ZIP 92241 | ZIP 92297 | |
| ZIP 93541 | ZIP 92371 | ZIP 93954 | ZIP 94851 | ZIP 93498 | |
| ZIP 93998 | ZIP 93610 | ZIP 93290 | ZIP 92615 | ZIP 94674 | |
| ZIP 94482 | ZIP 94839 | ZIP 94921 | ZIP 92889 | ZIP 93501 | |
| ZIP 94671 | ZIP 93480 | ZIP 94211 | ZIP 94300 | ZIP 94856 | |
| TO CLOSE | TO CLOSE | TO CLOSE | TO CLOSE | TO CLOSE | TO CLOSE |
| ZIP 92416 | ZIP 92545 | ZIP 94027 | ZIP 93343 | ZIP 93882 | |
| ZIP 94122 | ZIP 92923 | ZIP 94541 | ZIP 92615 | ZIP 92770 | |
| ZIP 93826 | ZIP 93127 | ZIP 93852 | ZIP 92700 | ZIP 92464 | |
| ZIP 92014 | ZIP 93002 | ZIP 92517 | ZIP 94357 | ZIP 93057 | |
| ZIP 93888 | ZIP 92813 | ZIP 94418 | ZIP 93516 | ZIP 93641 | |
| ZIP 94991 | ZIP 94745 | ZIP 93351 | ZIP 92562 | ZIP 92135 | |
| ZIP 93157 | ZIP 93644 | ZIP 94703 | ZIP 94503 | ZIP 92084 | |
| ZIP 92611 | ZIP 94795 | ZIP 93933 | ZIP 94497 | ZIP 92860 | |
| ZIP 92880 | ZIP 93042 | ZIP 94467 | ZIP 93172 | ZIP 93032 | |
| ZIP 93138 | ZIP 94441 | ZIP 93274 | ZIP 93847 | ZIP 92776 | |

Fig. 4

CUSTOMER REACH

| 987'551 | 901'761 | 816'912 | 783'925 | 714'406 | 634'515 |
|---|---|---|---|---|---|
| Solution5 | Solution4 | Solution1 | Solution3 | Solution2 | Solution6 |
| TO OPEN | TO OPEN | TO OPEN | TO OPEN | TO OPEN | TO OPEN |
| ZIP 92631 | ZIP 93312 | ZIP 93872 | ZIP 94078 | ZIP 93225 | |
| ZIP 94956 | ZIP 94397 | ZIP 94801 | ZIP 93764 | ZIP 93028 | |
| ZIP 92433 | ZIP 94393 | ZIP 92845 | ZIP 93160 | ZIP 93391 | |
| ZIP 92007 | ZIP 92331 | ZIP 94822 | ZIP 92514 | ZIP 93996 | |
| ZIP 92487 | ZIP 94978 | ZIP 93876 | ZIP 94374 | ZIP 92867 | |
| ZIP 92297 | ZIP 92241 | ZIP 94064 | ZIP 94609 | ZIP 92287 | |
| ZIP 93498 | ZIP 94851 | ZIP 93541 | ZIP 93954 | ZIP 92371 | |
| ZIP 94674 | ZIP 92615 | ZIP 93998 | ZIP 93290 | ZIP 93610 | |
| ZIP 93501 | ZIP 92889 | ZIP 94482 | ZIP 94921 | ZIP 94839 | |
| ZIP 94856 | ZIP 94300 | ZIP 94671 | ZIP 94211 | ZIP 93480 | |
| TO CLOSE | TO CLOSE | TO CLOSE | TO CLOSE | TO CLOSE | TO CLOSE |
| ZIP 93882 | ZIP 93343 | ZIP 92416 | ZIP 94027 | ZIP 92545 | |
| ZIP 92770 | ZIP 92615 | ZIP 94122 | ZIP 94541 | ZIP 92923 | |
| ZIP 92464 | ZIP 92700 | ZIP 93826 | ZIP 93852 | ZIP 93127 | |
| ZIP 93057 | ZIP 94357 | ZIP 92014 | ZIP 92517 | ZIP 93002 | |
| ZIP 93641 | ZIP 93516 | ZIP 93888 | ZIP 94418 | ZIP 92813 | |
| ZIP 92135 | ZIP 92562 | ZIP 94991 | ZIP 93351 | ZIP 94745 | |
| ZIP 92084 | ZIP 94503 | ZIP 93157 | ZIP 94703 | ZIP 93644 | |
| ZIP 92860 | ZIP 94497 | ZIP 92611 | ZIP 93933 | ZIP 94795 | |
| ZIP 93032 | ZIP 93172 | ZIP 92880 | ZIP 94467 | ZIP 93042 | |
| ZIP 92776 | ZIP 93847 | ZIP 93138 | ZIP 93274 | ZIP 94441 | |

CUSTOMER REACH

| 987'551 | 969'082 | 875'137 | | | |
|---|---|---|---|---|---|
| Solution5 | Solution4 | Solution1 | | | |
| TO OPEN | TO OPEN | TO OPEN | TO OPEN | TO OPEN | TO OPEN |
| ZIP 92631 | ZIP 93312 | ZIP 93872 | | | |
| ZIP 94956 | ZIP 94397 | ZIP 94801 | | | |
| ZIP 92433 | ZIP 94393 | ZIP 92845 | | | |
| ZIP 92007 | ZIP 92331 | ZIP 94822 | | | |
| ZIP 92487 | ZIP 94978 | ZIP 93876 | | | |
| ZIP 92297 | ZIP 92241 | ZIP 94064 | | | |
| ZIP 93498 | ZIP 94851 | ZIP 93541 | | | |
| ZIP 94674 | ZIP 92615 | ZIP 93998 | | | |
| ZIP 93501 | ZIP 92889 | ZIP 94482 | | | |
| ZIP 94856 | ZIP 94300 | ZIP 94671 | | | |
| TO CLOSE | TO CLOSE | TO CLOSE | TO CLOSE | TO CLOSE | TO CLOSE |
| ZIP 93882 | ZIP 93343 | ZIP 92416 | | | |
| ZIP 92770 | ZIP 92615 | ZIP 94122 | | | |
| ZIP 92464 | ZIP 92700 | ZIP 93826 | | | |
| ZIP 93057 | ZIP 94357 | ZIP 92014 | | | |
| ZIP 93641 | ZIP 93516 | ZIP 93888 | | | |
| ZIP 92135 | ZIP 92562 | ZIP 94991 | | | |
| ZIP 92084 | ZIP 94503 | ZIP 93157 | | | |
| ZIP 92860 | ZIP 94497 | ZIP 92611 | | | |
| ZIP 93032 | ZIP 93172 | ZIP 92880 | | | |
| ZIP 92776 | ZIP 93847 | ZIP 93138 | | | |

Fig. 6

| Parent 1 | Parent 2 | Parent 3 | Child 3 | Child 2 | Child 1 |
|---|---|---|---|---|---|
| TO OPEN | TO OPEN | TO OPEN | TO OPEN | TO OPEN | TO OPEN |
| ZIP 92631 | ZIP 93312 | ZIP 93872 | ZIP 93872 | ZIP 92631 | ZIP 93312 |
| ZIP 94956 | ZIP 94417 | ZIP 94801 | ZIP 94801 | ZIP 94956 | ZIP 94956 |
| ZIP 92433 | ZIP 94393 | ZIP 92845 | ZIP 92845 | ZIP 92433 | ZIP 92433 |
| ZIP 92007 | ZIP 92222 | ZIP 94822 | ZIP 94822 | ZIP 92007 | ZIP 92007 |
| ZIP 92487 | ZIP 94978 | ZIP 93876 | ZIP 94978 | ZIP 92487 | ZIP 92487 |
| ZIP 92297 | ZIP 92241 | ZIP 94064 | ZIP 92241 | ZIP 92297 | ZIP 92297 |
| ZIP 93498 | ZIP 94851 | ZIP 93541 | ZIP 94851 | ZIP 93541 | ZIP 93666 |
| ZIP 94674 | ZIP 92615 | ZIP 93998 | ZIP 92615 | ZIP 93998 | ZIP 92615 |
| ZIP 93501 | ZIP 92889 | ZIP 94482 | ZIP 92889 | ZIP 92889 | ZIP 92889 |
| ZIP 94856 | ZIP 94300 | ZIP 94671 | ZIP 94671 | ZIP 94300 | ZIP 94300 |
| TO CLOSE | TO CLOSE | TO CLOSE | TO CLOSE | TO CLOSE | TO CLOSE |
| ZIP 93882 | ZIP 93343 | ZIP 92416 | ZIP 93343 | ZIP 92416 | ZIP 93343 |
| ZIP 92770 | ZIP 92615 | ZIP 94122 | ZIP 92615 | ZIP 94122 | ZIP 92498 |
| ZIP 92464 | ZIP 92700 | ZIP 93826 | ZIP 92700 | ZIP 93826 | ZIP 92700 |
| ZIP 93057 | ZIP 94357 | ZIP 92014 | ZIP 94357 | ZIP 92014 | ZIP 92880 |
| ZIP 93641 | ZIP 93516 | ZIP 93888 | ZIP 93641 | ZIP 93888 | ZIP 93888 |
| ZIP 92135 | ZIP 92562 | ZIP 94991 | ZIP 92135 | ZIP 94991 | ZIP 94991 |
| ZIP 92084 | ZIP 94503 | ZIP 93157 | ZIP 94503 | ZIP 93157 | ZIP 93157 |
| ZIP 92860 | ZIP 94497 | ZIP 92611 | ZIP 94497 | ZIP 92611 | ZIP 92860 |
| ZIP 93032 | ZIP 93179 | ZIP 92880 | ZIP 93179 | ZIP 93032 | ZIP 93032 |
| ZIP 92776 | ZIP 93847 | ZIP 93138 | ZIP 93847 | ZIP 93847 | ZIP 92776 |

NETWORK BRANCH PLACEMENT TOOL

BACKGROUND OF THE INVENTION

1. Field of the Invention

The present invention relates generally to the field of network implementation, and more specifically to the field of network branch planning and placement.

2. Background of the Related Art

Whenever a company seeks to create or expand a service provider network consisting of branch locations by opening new stores, offices, and the like, the decision-makers must make several determinations. These include: how many branches to open; where to open them; and whether it is better to place a new branch within a populated area or between two or more populated areas.

Because of a lack of real data-gathering tools, traditional approaches to these questions generally may be reduced to one guideline: open a branch amongst the highest population of individuals possible where the company does not yet have a presence. This commonly used approach leaves unanswered many questions, including among others, whether a sprawling population will travel to a centrally based branch, and whether the traffic flow in the center of this area will take people away from the location.

By taking this simple approach, planners may well end up opening branches in unduly expensive areas, only to find that the population is doing its business elsewhere. Modern cities consist in large part of an inefficient network of roads, disparate population clusters, and assorted retail, commercial, industrial and residential areas. Consequently, the so-called "center of town" approach can leave planners with an expensive lease, no pass-by traffic, and the need to build yet another branch in another location.

Importantly, the "center of town" approach ignores significant, real-world, consumer behavior factors. For example, if 500,000 people live within the borders of City A, it could well be that another 300,000 live just outside of that city. The "center of town" approach may not effectively service that population. In other words, planners must consider whether the positioning of a "center of town" branch is going to service the satellite population.

Another common approach to the problem of network branch placement is to draw cartographically a circle of some radius around a center point in order to include other populations within the theoretical reach of a branch. While this approach may solve some problems associated with the "center of town" approach, it often introduces more errors and inaccuracies into the planning process. For example, consumers generally do not consider linear distances to branches when traveling (i.e., they do not think about traveling "as the crow flies"). Instead, consumers tend to think in terms of travel time (e.g., "driving time"), which may be affected by the presence or absence of: a direct route to the destination; freeways, highways and the like; areas of congestion; unusual traffic patterns; and traffic control devices such as traffic signals. Therefore, a potential customer who falls within an arbitrary cartographic circle may be further from a network branch in terms of travel time than another potential customer who falls outside the same circle.

Other current approaches may calculate travel time for potential populations; however, these approaches fail to assign any value to individual consumers or consumer populations and do not make adjustments to reflect travel time dependent probabilities nor any other factors which may affect network branch location value or consumer value. Such current approaches may be implemented using technology from MapInfo Corporation, One Global View, Troy, N.Y. 12180; Magellan Ingenierie S. A., 710, Avenue Aristide Berges, 38330 Montbonnot, France; and InfoTech Enterprises Europe Ltd, Holborn Hall, 100 Gray's Inn Road, London WC1X 8AL, United Kingdom, for example.

With these considerations in mind, it is desirable to have a network branch placement tool which utilizes real world consumer behavior data to ascertain optimal placement of network branch locations.

SUMMARY OF THE INVENTION

The present invention utilizes traditional factors and real world consumer behavior data, as well as pertinent other data such as market research, traffic flow patterns, satellite mapping, and the like to ascertain optimal network branch placement.

In the context of the present invention, a "service provider" is an entity that provides goods and/or services to service receivers. A "service provider" may also be called a "branch", "branch location" or a "network branch location" where the "network" is a collection of one or more branches. By way of illustrative examples, a service provider may be: a company location; all point of sales in ZIP Code 94901; a store; a stadium; a swimming pool; a police office; a delivery warehouse; a hospital, etc.; or a combination of one or more individual service providers, as in the case of a shopping mall.

A "service receiver" (also called a "service recipient") as used in the context of the present invention is an entity that needs, wants or consumes the goods or services that a service provider provides. For example, a service receiver may be: a customer; all males between age 20 and 35 that live in a certain area; a company; traffic accidents in ZIP code 94901; swimmers; spectators; stores; points of sale; and the like. Service receivers may be a combination of one or more individual service receivers, as in the case of a family.

A first preferred embodiment of the present invention includes a method for placing branch locations having the steps of: (a) identifying at least one service provider branch location, (b) identifying at least one service receiver, (c) identifying a measure of service receiver value, (d) calculating the value of each of the service receivers based on the measure of service receiver value, (e) determining which of the service provider branch locations is the closest service provider branch location for each of the service receivers, and (f) determining a probability that each of the service receivers will utilize the closest service provider branch location. The closest service provider branch location may be determined by travel time between the service receiver and the service provider branch location.

Additionally, the step of identifying a closest service provider branch location from the service provider branch locations for each of the service receivers may include the steps of: determining a travel time between each of the service receivers and one or more of the service provider branch locations, and for each of the service receivers, defining the service provider branch location with the shortest travel time as the closest service provider branch location for the service receiver.

The further step of determining a value for each of the service provider branch locations may be included. This step may include the step of summing for each service receiver for which the service provider branch location is the closest service provider branch location the products of (i) the value of the closest service receiver and (ii) the probability that the closest service receiver will utilize the service provider branch location. The further step of determining the value of the service provider branch network may also be included. The step of determining the value of the service provider branch network may include the step of determining network reach or the step of determining total network travel time.

Another preferred embodiment of the present invention includes a method for placing branch locations having the steps of: (a) identifying at least one service provider branch location, (b) identifying at least one service receiver, (c) identifying a measure of service receiver value, (d) calculating the value of each of the service receivers based on the measure of service receiver value, and (e) determining a probability that each of the service receives will utilize each of the service provider branch locations. The further steps of: (a) defining a probability threshold, and (b) determining a value for each of the service provider branch locations by assigning a portion of the value of each service receiver to each service provider branch location having a probability for the service receiver above the probability threshold may also be included. The step of determining a value for each of the service provider branch locations may include the step of summing the products of (i) the portion of the value of each of the service receivers assigned to the service provider branch location and (ii) the probability that the service receiver will use the service provider branch location.

The present invention also includes a method for optimizing a service provider network, one preferred embodiment thereof having the steps of: (a) selecting a network change parameter, (b) selecting a fitness parameter to be optimized, (c) selecting a calculation stop criterion, (d) applying a genetic algorithm to a population of solutions to create a new population of solutions, (e) assigning a value to each of the solutions of the new population to determine relative values of the solutions, and (f) repeating the steps (d) and (e) until the stop criterion is met.

The step of assigning a value to each of the solutions may include the steps of: (a) identifying at least one service provider branch location, (b) identifying at least one service receiver, (c) identifying a measure of service receiver value, (d) calculating the value of each of the service receivers based on the measure of service receiver value, (e) determining which of the service provider branch locations is the closest service provider branch location for each of the service receivers based on travel time between the service receiver and the service provider, (f) determining a probability that each of the service receives will utilize the closest service provider branch location, (g) determining a value for each of the service provider branch locations, and (h) determining the value of the solution based on the values of each of the service provider branch locations contained therein.

The step of applying a genetic algorithm to create a population of solutions may include the steps of: (a) discarding a number of solutions determined to be least valuable, (b) creating new, cross-over solutions from the solutions which have not been discarded, and (c) mutating a number of service provider locations within the new, cross-over solutions.

The step of determining a value for each of the service provider branch locations may include the steps of: (a) defining for each of the service receivers a closest service provider branch location based on travel time between the service receiver and the service provider branch location, and (b) for each of the service provider branch locations, summing the products of (i) the value of each of the service receivers for whom the service provider branch location is the closest service provider branch location and (ii) the probability that the service receiver will utilize the service provider branch location.

The step of determining a value for each of the service provider branch locations may also include the steps of: (a) calculating the value of each of the service receivers based on a measure of service receiver value, (b) determining a probability that each of the service receives will utilize each of the service provider branch locations, (c) defining a probability threshold, (d) assigning the value of each service receiver proportionally to each service provider branch location having a probability for the service receiver above the probability threshold, and (e) determining a value for each of the service provider branch locations by summing the products of (i) the value of each of the service receivers assigned to the service provider branch location and (ii) the probability that the service receiver will use the service provider branch location.

In any of the foregoing embodiments, the fitness parameter may be maximized or minimized, among other optimizations, and the stop criterion may be a number of iterations of the genetic algorithm or a number of iterations of the genetic algorithm wherein the fitness parameter fails to be further optimized, among other criteria.

These and other aspects of the subject invention will become more readily apparent to those having ordinary skill in the art from the following detailed description of the invention taken in conjunction with the drawings described herein.

BRIEF DESCRIPTION OF THE DRAWINGS

So that those having ordinary skill in the art to which the subject invention pertains will more readily understand how to make and use the subject invention, preferred embodiments thereof will be described in detail herein with reference to the drawings.

FIG. 4 is an example of a population of solutions.

FIG. 5 is an example of a population of solutions with value measurements shown.

FIG. 6 is an example of a population of solutions with the three least valuable solutions discarded.

FIG. 7 is an illustration of cross-over generation of child solutions from parent solutions.

FIG. 8 is an illustration of mutations applied to child solutions.

DETAILED DESCRIPTION OF THE PREFERRED EMBODIMENTS

Figure 1:
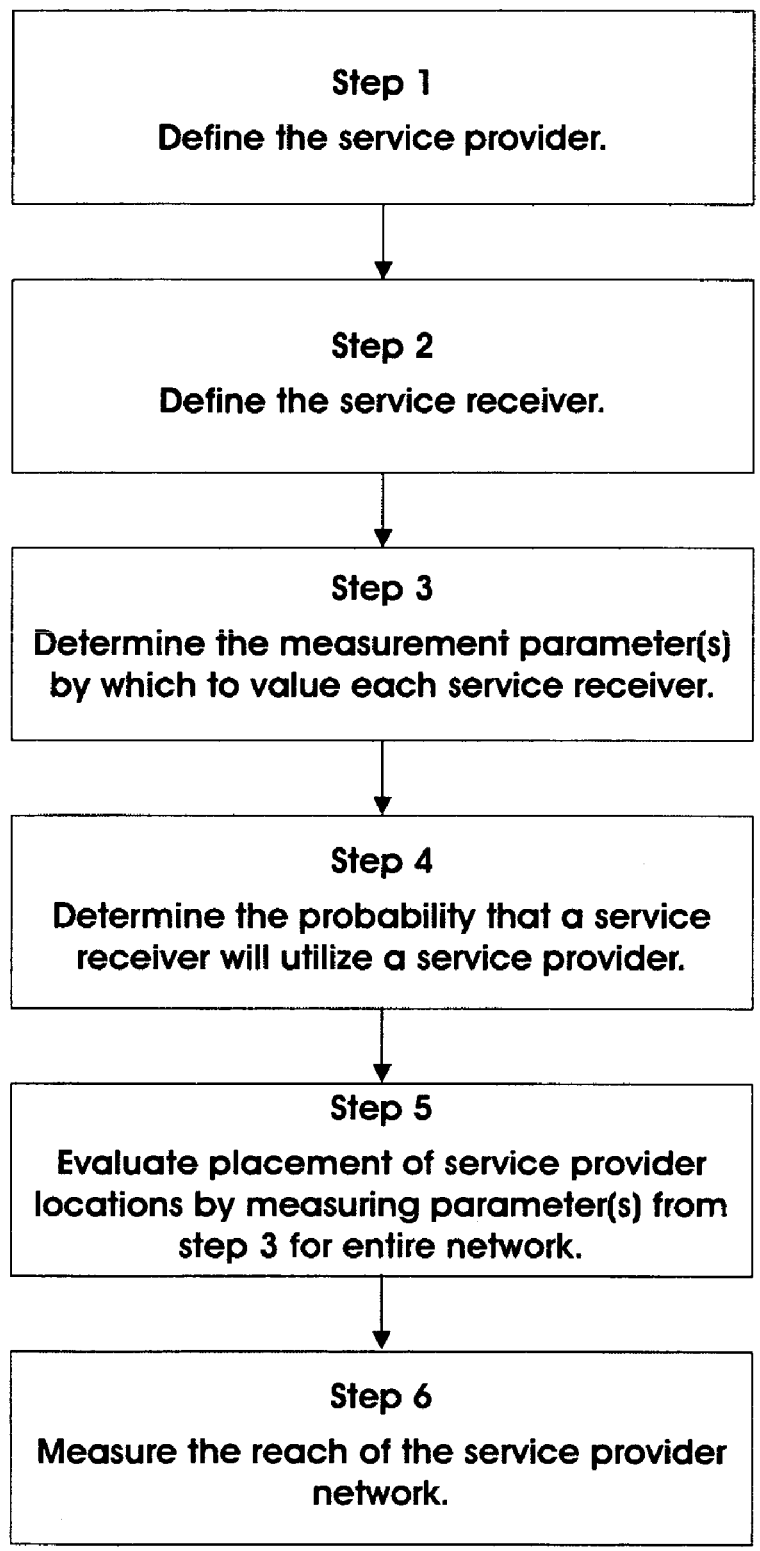
FIG. 1 is a flow chart enumerating measurement steps of a preferred embodiment of the present

Referring now in detail to the drawings wherein like reference numerals identify similar structural features of the several embodiments of the subject invention. As used here, "service receiver" is understood to include recipients of products, and "services" is understood to include products; that is, a "service receiver" may be a purchaser of products offered by the service provider, and the "services" rendered by the service provider may be products sold by the service provider.

FIG. 1 is a flow chart enumerating the steps of a preferred embodiment of the present invention. The several steps of FIG. 1 and other figures herein may proceed in the order illustrated; however, other ordering of the steps may also be utilized provided that input information required for any step is available prior to the commencement of that step. Thus, for example, steps 1 and 2 which follow may be interchanged chronologically without altering the outcome of the process.

The process may begin with the identification of the service provider at issue, indicated as step 1. Next, the service receiver must be identified, as indicated by step 2. This step includes the task of identifying service receivers of the particular service or services identified in step 1. These may be current service receivers of the identified services, potential new service receivers, or a combination of these two. Any method which identifies service receivers may be utilized, for example, focus groups, workshops, interviews with executives, marketing studies, demographic studies, public polls, analyses of database data, common sense analyses, and the like. Table 1 lists several examples of service providers and possible corresponding service recipients.

TABLE 1

|     | Service Provider | Service Recipient |
| --- | --- | --- |
| (A) | Life insurance agent offices in the United States | 20% current customers and 80% potential customers. |
| (B) | Points of Sales for Baby Diaper Brand "X" | Young families with babies |
| (C) | Police stations in Escambia County | Traffic Accidents where a police officer needs to be dispatched |
| (D) | New York Yankee stadium | New York Yankee fans |

The next step, indicated by step 3, is identifying a desirable measure of service receiver value for the services at issue. The measure may be as simple as equal valuation for each identified recipient (i.e., a "headcount" measure), meaning each service receiver counts as one. Alternatively, the measure may be as complex as the potential future profit a service provider can make from a particular service receiver. In this case, economic, consumer behavior and financial evaluations, among others, may be utilized in the valuation process. Other possible measures may include analyses of recipients' demographics, income levels (including analyses of disposable incomes), psychographics, and the like. Still other possible measures may include severity of traffic accidents (in the case of ambulance and EMS service providers, for instance), frequency of incidents of burglary (in the case of police and security service providers, for instance) and number of baseball tickets purchased per year (in the case of professional baseball team service providers, for instance). The foregoing examples of valuations are intended to be illustrative, and many others may be utilized as appropriate without departing from the teachings of the current invention.

Next, as indicated by step 4, one must determine the probability (i.e., the likelihood) that each specific identified service recipient will utilize services from the service provider. This analysis may consist of assigning probabilities based on travel time between the service recipient and service provider. The analysis may alternatively consider other factors such as consumer behavior statistics, operational hours of the service provider, and the like. Various combinations of the foregoing analyses may also be used to determine the relevant probabilities. Any analysis or combination thereof may be utilized, provided the analysis yields a probability that a particular service receiver will utilize the services of a particular service provider.

By way of illustrative example, an analysis of probabilities based on travel time may yield the data shown in table 2.

TABLE 2

| Travel Time (in minutes) | Probability |
| --- | --- |
| 10 | 95% |
| 15 | 80% |
| 20 | 70% |
| 25 | 60% |
| 30 | 30% |
| 35 | 10% |
| 40 | 5% |

This means that 95% of the service recipients are willing to drive 10 minutes or less to visit the service provider, while 80% of the service recipients are willing to drive 11 to 15 minutes to visit the service provider, and so on. From this, one may determine, for example, that if 100 service recipients live 23 travel minutes away from a service provider location, 60 people would be counted towards a location (or 60% of a person, if only one person lives withing 23 minutes). If one desires to analyze a competitor's locations, it may be necessary to obtain the same travel time profiles (as describes above) for the competitor's clients, for example, through market research. If the competitors are sufficiently similar, often the same travel time profile may be chosen.

After determining the necessary probability or probabilities, one may proceed to begin to evaluate placement of service provider locations, as indicated by step 5. This step is accomplished by first determining the value of each service recipient based on the parameter or parameters identified in step 3. For example, the value may be the population of a service recipient (e.g., the number of individuals living within a zip code). Next, travel times between each service receiver and its closest service provider are determined. This may be accomplished using geographical information about the exact or approximate locations of service providers and service receivers and either a precalculated database containing travel time data, or the travel times calculated using routing systems. A "routing system" is a computer running an appropriate program that is capable of calculating travel times between two locations. The system may use a database that contains information about road segments and the like necessary to calculate travel times.

The results of the analysis of step 5 may be tabulated as illustrated in Table 3 using the data from Table 2.

TABLE 3

| Service Recipient | Individuals | Closest Provider | Travel Time (min.) |
| --- | --- | --- | --- |
| 94901 | 100 | Branch # 4 | 19 |
| 94969 | 50 | Branch # 3 | 12 |
| 94963 | 250 | Branch # 4 | 37 |
| 94960 | 200 | Branch # 2 | 6 |
| 94564 | 300 | Branch # 1 | 35 |

The service recipients identified in Table 3 are zip codes, each with an associated value based on the number of individuals living therein. A closest service provider in the form of "branch" has been identified for each service recipient, and the travel time has been determined for each service recipient/ service provider pair. As an alternative, the same analysis may have been performed with each individual being considered a service recipient, with state counties as service recipients, or any other definition appropriate to the services in question. Appropriate valuations in these situations would be selected as discussed previously.

With the analysis of step 5 completed, one may measure the value of each branch location, and then the total value of the network, as illustrated by step 6. This may be accomplished by multiplying for each service recipient/service provider pair identified in step 5 the probability associated with the travel time for the pair by the value of the service recipient of the pair. These products may then be summed for each service provider. Where the value being measured is the number of individuals being serviced, the value may be called the "reach".

The result of step 6 on the service recipient/service provider pairs of Table 3 may be tabulated as shown in Table 4.

TABLE 4

| Service Recipient/ Individuals | Closest Provider | Travel Time (min) | Probability of Visit | Branch Reach |
|---|---|---|---|---|
| 94901/100 | Branch # 4 | 19 | 70% | 70 |
| 94969/50 | Branch # 3 | 12 | 80% | 40 |
| 94963/250 | Branch # 4 | 37 | 10% | 25 |
| 94960/200 | Branch # 2 | 6 | 95% | 190 |
| 94564/300 | Branch # 1 | 35 | 5% | 15 |
| TOTAL | | Avg. 13 minutes/recipient | | 340 |

The data provided in Table 4 enable a variety of useful analyses. For example, one may determine the reach of each provider location, and the total potential client count for each provider location, the number of service receivers available to all provider locations, among other calculations. It is further possible to calculate the average travel time for all service recipient/service provider pairs. This calculation may be particularly useful in cases where the probability of usage is 100% (i.e., when every service receiver must visit a service provider). Finally, this measure of total network value forms the basis for a variety of further analyses and optimizations.

Item "C" of Table 1 presents an illustrative scenario wherein one or more police stations must be located where they can efficiently respond to traffic accidents. In this example, the service provider may be defined in step 1 as police stations and the service recipient may be defined in step 2 as traffic accidents. In step 3, the relative values of various accidents may be severity of accident, which in turn may be measured in terms of dollar value of damages caused by the accident, severity of injuries of the accident, number of automobiles and/or persons involved in the accident and the like. These valuations may rely on historical data for the area or areas at issue. Alternatively, each accident may be valued equally.

It may be assumed that a police office must visit each and every accident, and so the probability of utilization of the service provider is 100% for each service recipient; however, the probability that a service provider may service a particular service recipient in adequate time may depend on drive time, and so this number may be applied in step 4. The remaining steps in the present example are then identical to steps 5 and 6 of the preceding example. Alternatively, total travel time instead of network reach may be calculated for network value, with the intent of minimizing total travel time for the network.

By way of final example, item "D" of Table 1 presents a scenario where a new baseball stadium (in this case, a new "Yankee Stadium") is to be placed. The service provider identified in step 1 is thus the stadium, while the service recipients may be defined in step 2 as New York Yankee fans. Population data for these recipients may be acquired from any relevant source, including, for example, fan club member lists, current ticket holder lists, and survey results, among others. Valuation of service recipients in step 3 may be based on aggregate values of average annual ticket purchases (e.g., recipients in geographic area 1 spent on average x dollars while those in area 2 spent y dollars, and so on). Alternatively, a common average amount may be applied equally to all recipients, or other common amounts may be applied. Finally, the value of a season ticket may be applied to each recipient. Other measures, which may combine these or other measures, may also be utilized.

Next, the likelihood of each service recipient attending baseball games at the service provider location must be determined in step 4. This determination may be based on statistical data, surveys and the like, and may be tabulated as shown in Table 5. From table 5 it may be understood that there exists a correlation between the travel time from a service recipient location to the service provider and the percentage of games attended. This percentage may be used as the travel time dependent probability of step 4 in the present example.

TABLE 5

| Travel Time (in minutes) | % of Total Games Attended |
|---|---|
| 0-5 | 65% |
| 6-10 | 50% |
| 11-25 | 30% |
| 26-40 | 20% |
| 41-60 | 10% |
| 61-120 | 2% |

Next, in step 5, the travel time for each identified service recipient is determined. Finally, the value of the service provider location (i.e., the service provider branch network—in this case, a network of one branch) is determined by multiplying the percentage of total games attended based on travel time for each service recipient by the measure determined in step 3 for the recipient. This yields a total value for the network which may be measured in total dollars of tickets to be sold.

The definition of service recipient may be more complicated than those of the previous examples. For instance, as indicated by item "A" in Table 1, a service recipient may be defined as a mix of current and potential new customers. In such instances, the value of each service recipient may be determined in step 3 as follows. A service recipient may be defined as 20% potential future customers and 80% present customers within a zip code. Current customer counts within each zip code may be determined by utilizing company customer data, survey results and the like. Potential future customers may be determined by using market research or statistical data, for example. The number of potential future customers in the present example would then be multiplied by 20%, the number of current customers multiplied by 80%, and the two products added to arrive at a valuation for the service recipient zip code.

While the preceding examples assign branch location value based on service receivers utilizing only the closes branch location, other measures may also be utilized. One such approach is to assign service receivers proportionally (or to proportionally assign their values) to all the service providers within a relevant travel time (e.g., to all service provider branch locations with travel times less than a pre-defined threshold). Taking as an example of this approach a service recipient defined as zip code 94901 having 3,900 individuals living therein, travel time dependent probabilities may be defined as indicated in Table 6.

TABLE 6

| Branch # | Travel Time (in minutes) | Probability |
|---|---|---|
| 1 | 20 | 80% |
| 2 | 40 | 40% |
| 3 | 60 | 10% |

Table 6 shows that 80% of individuals are willing to travel for 20 minutes to a service provider branch location, 40% are willing to travel 21 to 40 minutes, and 10% are willing to travel 41 to 60 minutes. Utilizing the previously discussed methodology, the closest branch would be identified as Branch # 1, which is 20 minutes travel time. Multiplying the associated probability of 80% by the value of the service recipient (measured here by number of individuals and equaling 3,900), one may arrive at a service branch location value of 3,120 for this service recipient. Under the current methodology, however, each branch with a probability of greater than 0, for instance, would receive a proportionate value of the service receiver's value as follows. Therefore, the probability number associated with each branch may be multiplied by the service receiver's value as just discussed. In the present example, the results of this calculation may be tabulated as shown in Table 7.

TABLE 7

| Branch # | Service Receiver Value | Probability | Calculated Branch Reach |
|---|---|---|---|
| 1 | 3,900 | 80% | 3,120 |
| 2 | 3,900 | 40% | 1,560 |
| 3 | 3,900 | 10% | 780 |
| Calculated Total Network Reach | | | 5,460 |

The total network reach calculated using this methodology, however, exceeds the total achievable value of the service provider network (i.e., in the present example, the number of individuals reached by the entire network exceeds the actual number of individuals), and so the calculated reach must be adjusted by the amount of over-calculation. The calculated network reach in the present example is 5,460 while the actual maximum total reach is 3,900, and so the calculated reach for each branch location, and consequently the total network reach, must be adjusted downwards by 40% (representing 3,900/5,460). The resulting adjusted reach, which reflects an adjusted proportional assignment of service receivers to service provider branch locations, may be tabulated as shown in Table 8. This adjustment has the effect of assigning only a portion of the value of each service recipient to the relevant service providers.

TABLE 8

| Branch # | Calculated Branch Reach | Adjustment | Adjusted Branch Reach |
|---|---|---|---|
| 1 | 3,120 | 40% | 2,229 |
| 2 | 1,560 | 40% | 1,114 |
| 3 | 780 | 40% | 557 |
| Adjusted Total Network Reach | | | 3,900 |

Figure 2:
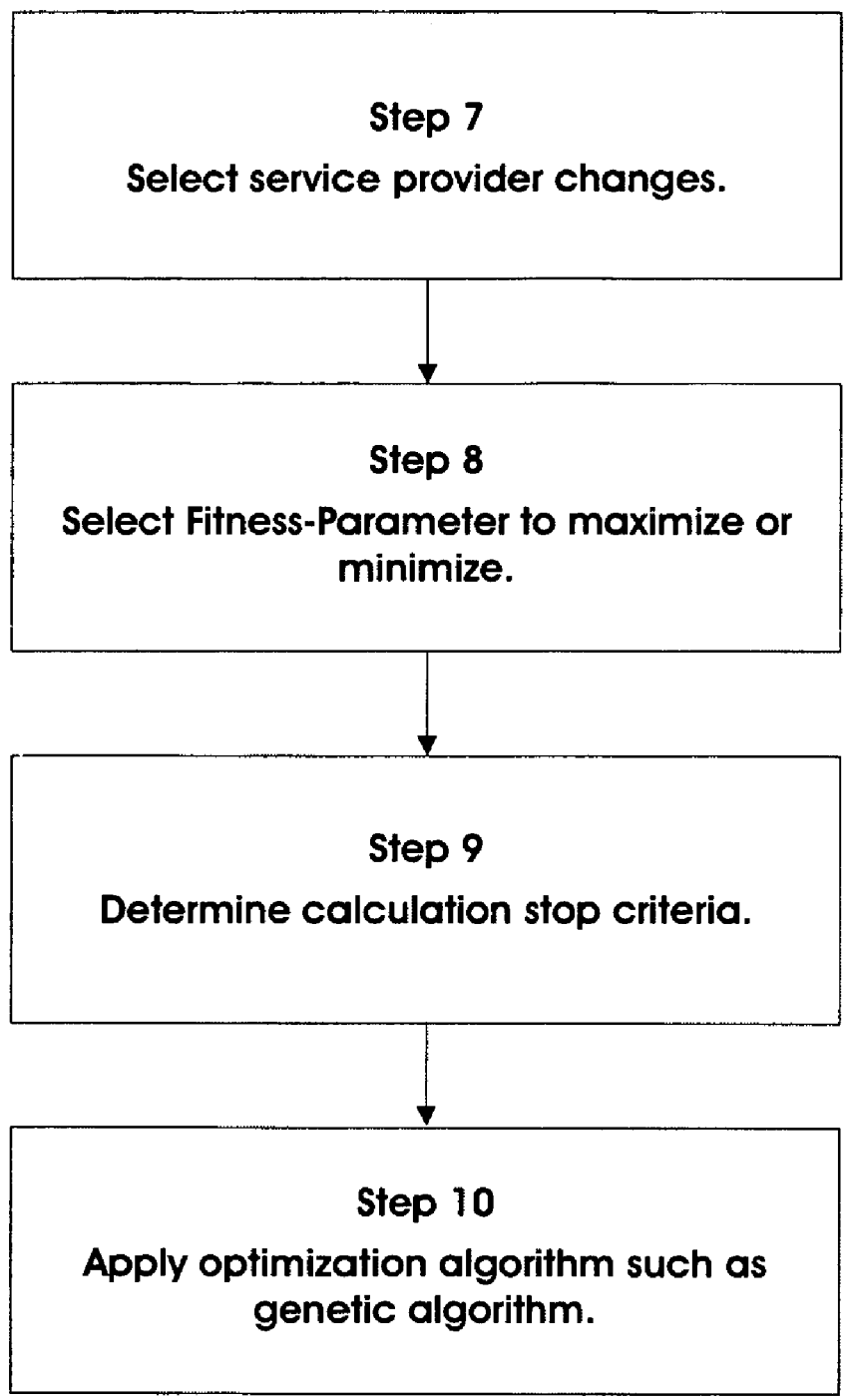
FIG. 2 is a flow chart enumerating optimization steps of another preferred embodiment of the present invention.

Another preferred embodiment of the present invention includes the optimization of service provider networks. FIG. 2 is a flow chart enumerating the optimization steps of this preferred embodiment of the present invention.

The optimization begins with the selection of a network change parameter; that is, a parameter of the network which is to be changed to effectuate the optimization. This step is indicated in FIG. 2 by step 7. Network change parameters may include the number of service provider locations to open and/or close. Other parameters may include geographic limitations, store size, specific product selections, specific services provided, and the like.

Next, a fitness parameter or parameters must be determined, as indicated by step 8. Each fitness parameter will be determined for each branch location to calculate a relative value for that location. Fitness parameters may include, among others, provider reach (such as may be determined in step 6 of FIG. 1), and travel time from service receiver to service provider. Fitness parameters may be maximized, for example in the case of provider reach, or may be minimized, for example in the case of travel time.

Next, a calculation stop criterion or criteria must be determined, as indicated by step 9. The optimization algorithm of the present embodiment utilizes an iterative approach, and so at no point can any absolute minimum or maximum be determined; only relative comparisons can be made. As a result, it is desirable to set a criterion or criteria which will indicate when calculation should be terminated. For example, one may decide that the optimization process will terminate upon a certain number of calculation iterations having been completed. Likewise, one may decide that the optimization process will terminate after a certain number of iterations have occurred which failed to yield results improving upon previous results. Alternatively, one may decide that the optimization process will terminate after a certain time has elapsed. Other calculation stop criteria may also be utilized, as will be appreciated by those of skill in the art.

Figure 3:
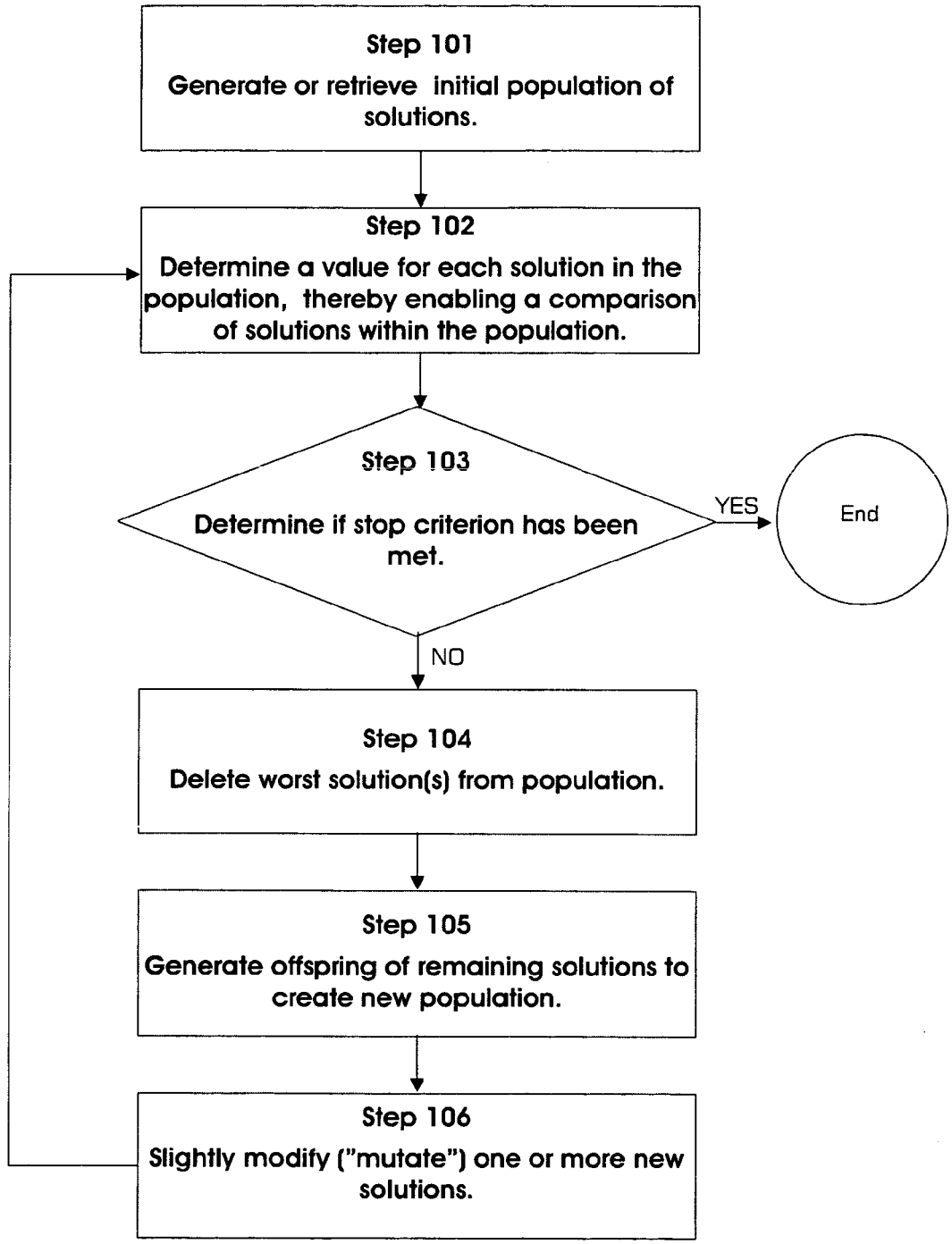
FIG. 3 is a flow chart of details of optimization calculations of a preferred embodiment of the present invention.

After the completion of steps 7 through 9, that is, once the necessary parameters have been determined, the optimization calculation or calculations may be executed, as indicated by step 10. In the present preferred embodiment, optimization is achieved utilizing a genetic algorithm as detailed in FIG. 3. The genetic algorithm commences with the generation of several initial proposed solutions, that is, a number of branch location placements, as indicated by step 101. These solutions may be referred to as a population. Each solution in the population includes a number of proposed new branch locations and/or a number of proposed present branch locations to be closed.

By way of example, one may consider a company having 500 branches in an area consisting of all the zip codes from 92000 to 95000. The company desires to improve its overall reach by replacing up to 10 locations (i.e., zip codes) of the current 500 locations, where the service receivers are defined as individuals living within the zip codes. A possible population of solutions resulting from step 101 is shown in FIG. 4.

The value of each solution is measured as indicated by step 102. Steps 1 to 6 of FIG. 1 are applied to each service provider location of each solution to determine a value for each solution, thereby enabling a comparison of solutions within the population.

Taking again the previous example, the calculations of steps 1 through 6 of FIG. 1 may yield customer reach values for each solution as shown in FIG. 5. The solutions have been arranged according to the relative value of each solution in the population; i.e., they have been placed in rank order. It may be seen that "Solution 5", indicated by numeral 51, has a calculated customer reach of 987,551, rendering it the best (i.e., most valuable) solution of the population, while "Solution 6", indicated by numeral 52, has a calculated customer reach of 634,515, rendering it the worst (i.e., least valuable) solution of the population.

After the measurement step 102, a determination may be made as to whether the calculation stop criterion or criteria have been met, as indicated by step 103. If so, optimization terminates and the highest ranked solution of the population may be deemed the best optimized network. If not, the process proceeds to step 104 in which the worst solutions are deleted from the population. The number of solutions to delete from the population may be determined prior to commencing the optimization (i.e., it may be a parameter of the optimization), or a random number of solutions may be deleted, provided that enough solutions remain in the population to allow for adequate cross-over of solutions, as descried in detail below. After deleting the worst 50% of the population of the previous example, for instance, the population would look as depicted in FIG. 6.

Figure 7:
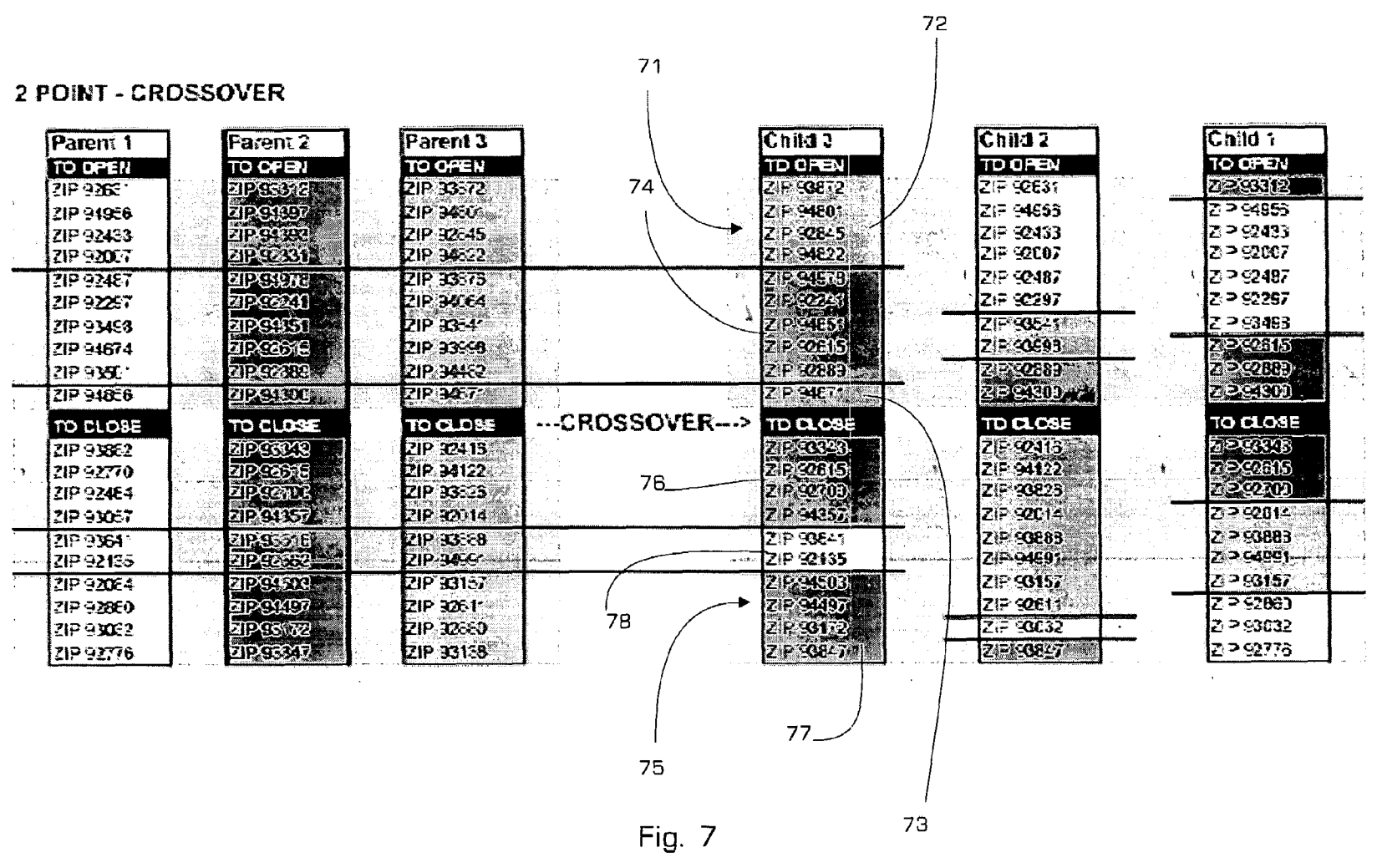

Next, a new population is generated from a cross-over of the solutions remaining in the population, as indicated by step 105. The solutions of the new population are created by combining branch locations (both for addition and deletion) from the remaining solutions, as is illustrated in FIG. 7. Portions from remaining solution are chosen—for reproduction and appear in child solutions.

Various methods may be utilized to determine which solutions may be utilized in the cross-over, including among others, random selection and probability based selection. In the latter method, solutions which rank higher (e.g., have a greater customer reach) have a greater probability of contributing branch locations to the new population. Solutions of the new population may be created from two or more parent solutions.

Different methods of cross-over may be utilized. For example, a 2 point crossover consisting of 2 cuts for the "to open" and 2 cuts for the "to close" may be performed, where each cut defines the areas in a solution to be swapped. The number of cuts may be determined before the genetic algorithm starts or may be generated randomly.

Taking the present example, a cross-over to produce a population of three new solutions may look as depicted in FIG. 7. The "to open" portion of Child 3, 71, consists of two parts from Parent 3, 72 and 73, and one part from Parent 2, 74, while the "to close" portion of Child 3, 75, consists of two parts from parent 2, 76 and 77 and one part from parent 1, 78. The result is a new population consisting of three children (i.e., three new solutions) and three parents (i.e., the three surviving solutions from the previous population). In a similar manner, child 2 and child 1 have each inherited portions of various parent solutions.

Next, all but the best solution may be modified slightly ("mutated"), as indicated by step 106. The best solution is not mutated because it represents the best solution presently determined, and mutation of this solution may result in its loss. A predetermined or random number of branch locations (both to be added and deleted) are altered slightly within a predetermined or random number of solutions (excluding the best solution), resulting in a new population which differs slightly from the population previously obtained.

In the case of the present example, the mutations may be in the form of an increase or decrease of 10% in the zip code of one or more branch location within a solution. The resulting population may appear as depicted in FIG. 8. The best solution, 81, remains unaltered, while 40% of the remaining solutions are randomly selected for mutation. Locations 82, 83 and 84 in solution 85 and locations 86, 87 and 88 in solution 89, representing 15% of the total locations of the two chosen solutions, have been randomly changed by a magnitude of up to 20% (i.e., a zip code that is changed may increase or decrease by up to 10%).

The optimization continues by returning (i.e., looping) to the measurement step 103.

All of the foregoing embodiments may be implemented in a computer system running appropriate software. The computer system may be comprised of a central processing unit, volatile and non-volatile memory, and appropriate input and output devices. The appropriate software may be written in C, C++, Perl, Python, Basic, Pascal or any other programming language having the necessary functionality. Those of ordinary skill in the relevant computer arts may readily create such software based on the foregoing descriptions.

While particular embodiments of the present invention have been shown and described, it will be apparent to those skilled in the pertinent art that changes and modifications may be made without departing from the invention in its broader aspects.

What is claimed is:

1. A method for placing branch locations comprising the steps of:
    (a) submitting geographical information for a plurality of service provider branch locations to a central processing unit of a computer system, wherein said geographical information comprises an exact or approximate location of each of said service provider branch locations;
    (b) identifying a plurality of groups of service receivers from a list of service receivers recorded within or accessible by the central processing unit, and instructing the central processing unit to calculate a population number of service receivers within each group of service receivers;
    (c) submitting a measure of service receiver value to the central processing unit through the computer system, wherein the measure of service receiver value represents a product of (i) the population number of service receivers within each group of service receivers and (ii) an average income level of the service receivers within each group of service receivers;
    (d) instructing the central processing unit to calculate the value of each of said groups of service receivers based on said measure of service receiver value;
    (e) instructing the central processing unit to determine which of said service provider branch locations is the closest service provider branch location by average travel time for each of said groups of service receivers using a routing system, wherein the routing system extracts, from a database, drive time information for road segments between each of the service receivers within each group and each of said service provider branch locations;
    (f) instructing the central processing unit to calculate a probability value of whether service receivers within each group of services receivers will utilize said closest service provider branch location, wherein said probability value is based upon (i) an average drive time between said service receivers and said closest service provider branch location and (ii) consumer behavior statistics;
    (g) instructing the central processing unit to calculate a value of service provider branch network for each service provider branch location, wherein the value of service provider branch network is calculated by summing for each group of service receivers for which each service provider branch location is said closest service provider branch location the products of (i) the value of each group of service receivers as calculated in step (d) and (ii) the probability value of whether each group of service receivers will utilize said service provider branch location as calculated in step (f);

(h) instructing the central processing unit to identify the service provider branch location having the highest value of service provider branch network;

(i) defining a probability threshold;

(j) determining the value of service provider branch network for each of said service provider branch locations based only on groups of service receivers having a probability value above said probability threshold;

(k) instructing the central processing unit to discard service provider branch locations having a value of service provider branch network below a threshold value;

(l) instructing the central processing unit to identify a mutated set of service provider branch locations, wherein the mutated set of service provider branch locations have a value of service provider branch network above the threshold value and exclude the service provider branch location having the highest value of service provider branch network;

(m) mutating geographical information for each service provider branch location within the mutated set of service provider branch locations to create modified geographical information, wherein said geographical information consists of a zip code and said mutation step comprises increasing or decreasing the zip code; and (n) repeating steps (a) through (m) by submitting the modified geographical information to the central processing unit as the geographical information recited in step (a) until a stop criterion is satisfied.

2. The method of claim 1, wherein said mutation step comprises increasing or decreasing the zip code by 10%.

\* \* \* \* \*